United States Patent [19]

Farris

[11] Patent Number: 4,607,953
[45] Date of Patent: Aug. 26, 1986

[54] VACUUM EXPOSURE REGISTRY APPARATUS

[76] Inventor: Jimmy L. Farris, 2394 N. Waterbury, Orange, Calif. 92665

[21] Appl. No.: 762,927

[22] Filed: Aug. 6, 1985

[51] Int. Cl.⁴ ............................................. G03B 27/20
[52] U.S. Cl. ..................................................... 355/91
[58] Field of Search ............................ 355/73, 76, 91; 248/362

[56] References Cited

U.S. PATENT DOCUMENTS

| | | | |
|---|---|---|---|
| 3,066,592 | 11/1962 | Ott | 355/91 |
| 3,259,046 | 7/1966 | Nishimura | 355/91 |
| 3,507,594 | 4/1970 | Rucinski | 355/91 |
| 4,032,233 | 6/1977 | Oscarsson | 355/91 |
| 4,089,603 | 5/1978 | Jacobs | 355/91 X |
| 4,423,851 | 1/1984 | Heitmann | 248/362 |

*Primary Examiner*—Richard A. Wintercorn
*Attorney, Agent, or Firm*—William L. Chapin

[57] ABSTRACT

A vacuum exposure registry apparatus holds a thin, image-bearing sheet in intimate contact with a flat photo-sensitive surface while exposing both to a light source to register an image on the photo-sensitive surface. The apparatus includes a flat plate made of rigid transparent material and having a hollow, tubular vacuum fitting extending through the plate near a corner of the plate. A flexible elastomeric tube joinable at its ends to form a continuous perimetral loop is placed aroun an image-bearing sheet lying on a photo-sensitive surface. The plate is then placed down on the upper surface of the elasomeric tube, with the lower opening of the vacuum fitting within the perimetral boundary defined by the loop. Applying a vacuum to the vacuum fitting evacuates the region within the loop and between the plate and photo-sensitive surface, drawing the surface and overlying image-bearing sheet into tight contact with the underside of the plate.

14 Claims, 7 Drawing Figures

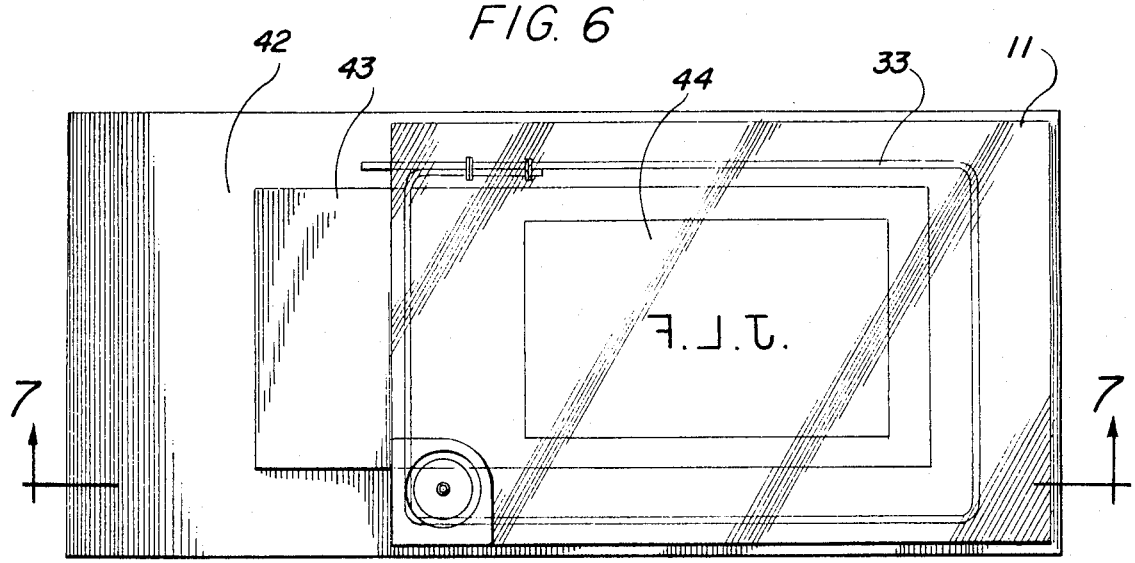
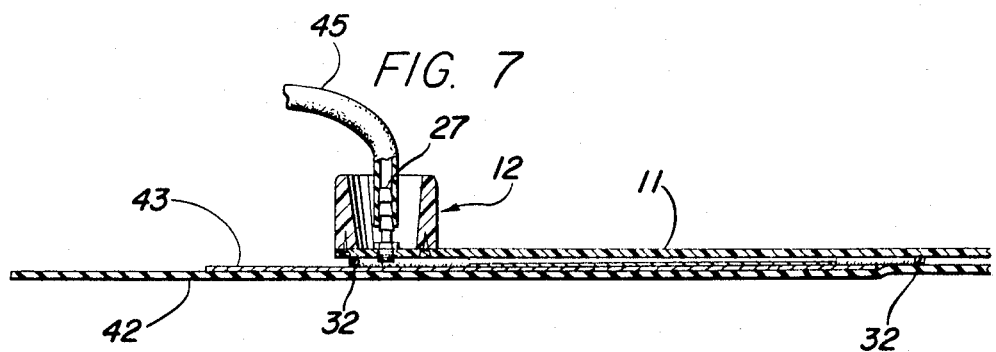
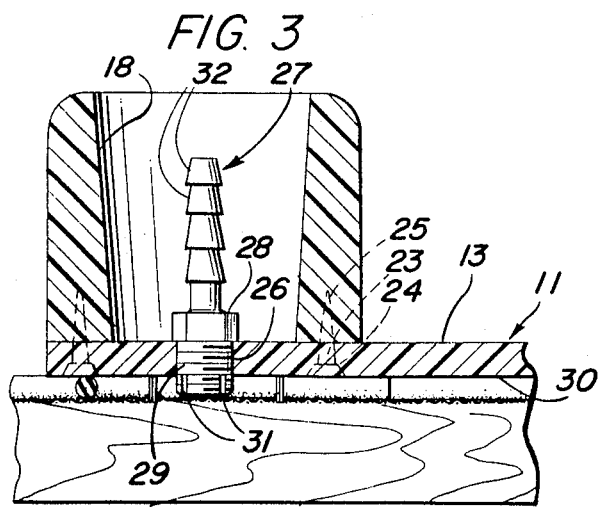
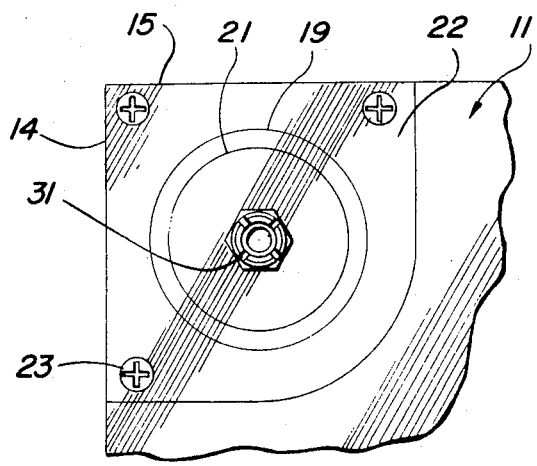

VACUUM EXPOSURE REGISTRY APPARATUS

BACKGROUND OF THE INVENTION

1. Field of the Invention

The present invention relates to an apparatus of the type used to hold an image-bearing photographic transparency in intimate contact with a photo-sensitive surface in which it is desired to register an image. More particularly, the invention relates to photographic exposure apparatus of the type which uses vacuum pressure to hold an image-bearing sheet in intimate contact with a photo-sensitive surface while exposing both to a light source

2. Description of Background Art

Photographic processes are used extensively in the printing industry to make printing plates, cylinders and the like which are then used to transfer ink images to the surface of paper, fabric, metal and other materials.

For example, metal plates used in offset printing are first coated with a photo-sensitive material. Next, a negative photographic transparency containing the printed words and pictoral content to be printed is placed in intimate contact with the photo-sensitized offset printing plate. The upper surface of the transparency is then exposed to a strong light source, causing photochemical reactions in various areas of the photo-sensitizied plates proportional to the transparency of the corresponding area of the transparency. Since the exposure process generally requires a substantial period of time, it is essential that the transparency and plate remain in a fixed position with respect to one another during the exposure period. Otherwise, the image produced in the exposed photo-sensitive material will be blurred.

The requirement for stable registration of an image on the photo-sensitive material necessitates the use of an apparatus which holds the photo-sensitive plate and the photographic transparency immobile during exposure. Vacuum pressure is a frequently used means by such apparatus to draw the transparency and plate tightly together during the exposure operation. This method of preventing movement of the transparency relative to the photo-sensitized plate has the additional advantage of minimizing the path length of light rays having passed through the transparency to the photo-sensitive surface. Minimum light path lengths are required in this form of exposure, referred to as a contact exposure, to ensure production of a sharp, well-defined image.

Several U.S. Pats. disclose exposure registry apparatus employing vacuum pressure. For example, Ott, in U.S. Pat. No. 3,066,592, Dec. 4, 1962, discloses the use of a flexible cord to define and seal the perimeter of a vacuum-tight region between a flexible acetate sheet and a rigid photo-sensitized plate. Oscarrson, in U.S. Pat. No. 4,032,233, June 28, 1977, and Jacobs, in U.S. Pat. No. 4,089,603, May 16, 1978, both disclose the use of a resilient gasket to form the perimeter of a vacuum-tight region between flat plates. Heitmann, in U.S. Pat. No. 4,423,851, Jan. 3, 1984, discloses the use of a rubber cloth with an integral, resilient bead to form a vacuum-tight seal with a flat plate.

After a photographic printing plate has been exposed as described above, the plate is treated with chemicals which develop the latent image present in the exposed photo-sensitive surface. The developing process makes those areas on the surface of the plate which are to transfer ink to a surface during the printing process selectively cohesive to ink.

In preparing a silk screen for printing by the silk screen process, a photographic method similar to that used to prepare photo offset printing plates is often used. In the customary method of placing an image to be printed on a silk screen, a photographic positive is placed directly on a silk screen which has been coated with a photo-sensitive emulsion, and both screen and positive are placed together in an exposure frame. Typically, the frame uses vacuum to hold the positive and screen tightly together. The positive and screen are then exposed to a bright light source which hardens the photo-sensitive emulsion in the exposed areas. The screen and positive are then removed from the frame and separated. In the final step of preparing the screen for printing, the screen is flushed with water. This operation selectively dissolves and removes the unexposed areas of the photo-sensitive emulsion.

The silk screen prepared as described above is used to print images on a surface by placing the lower surface of the screen in close contact with a surface, pouring ink on the upper surface of the screen above the image, and then drawing a squeegee across the ink. This forces ink through the open areas of the screen, and onto the surface to be printed.

As has been mentioned previously, the various types of apparatus used to hold a photographic positive in tight contact with a photo-sensitized surface of a printing plate or silk screen frequently employ vacuum pressure to clamp the two together during the exposure process. Many of the machines performing this function are costly, complicated, and limited in their flexibility to perform various clamping tasks related to photographic exposure. In response to a perceived need for an improved vacuum exposure registration apparatus, the present invention was conceived of.

OBJECTS OF THE INVENTION

An object of the present invention is to provide a vacuum holding apparatus for holding two planar surfaces in intimate parallel contact.

Another object of the invention is to provide a vacuum holding apparatus adaptable to various shapes and dimensions of planar objects to be clamped together in intimate parallel contact.

Another object of the invention is to provide a vacuum holding apparatus which is easily portable.

Another object of the invention is to provide a vacuum holding apparatus which is useable with planar objects of larger areas then the apparatus itself.

Another object of the invention is to provide a vacuum holding apparatus useable with a variety of vacuum sources.

Various other objects and advantages of the present invention and its most novel features will become apparent to those skilled in the art by reading the accompanying specifications and claims.

It is to be understood that although the invention disclosed herein is fully capable of achieving the objects and providing the advantages described, the description of the invention contained herein is merely illustrative of the preferred embodiments. Accordingly, I do not intend that the scope of my exclusive rights and privileges in the invention be limited to the details of the embodiments described. I do intend that reasonable equivalents, adaptations and modifications of the various embodiments and alternate forms of the present invention which are described herein be included within the scope of this invention as particularly pointed out by the appended claims.

SUMMARY OF THE INVENTION

Briefly stated, the present invention comprehends an apparatus which uses vacuum pressure to hold two planar objects in intimate parallel contact. Specifically, the apparatus is intended to hold a thin sheet containing an image to be produced in intimate contact with a photo-sensitized surface, assuring proper registration of the photographic image produced on the photo-sensitized surface when the sheet and surface are exposed to a light source.

The apparatus according to the present invention includes a flat plate made of a rigid transparent material. A hole through the plate and positioned near a corner of the plate communicates with a vacuum fitting extending upward from the plate.

The basic embodiment of the invention is intended for use with a flexible, air impermeable photo-sensitized surface such as a silk screen completely coated with a photo-sensitive emulsion. Included in the basic embodiment is a resilient flexible tube containing a coaxial, flexible wire running through the tube.

The vacuum registry apparatus according to the present invention is used as follows: a silk screen is stretched taut in a rectangular frame, and the upper surface is coated with a photo-sensitive emulsion, in a manner familiar to those knowledgeable in the preparation of silk screens for printing. The emulsion fills the openings in the mesh of the silk screen. Thus, after the emulsion has dried, the coated region of the silk screen is impermeable to air.

A photographic positive or other thin, planar object defining an image to be produced is placed on the dry, emulsion coated surface of the silk screen. The resilient, flexible tube forming part of the invention is bent into shape and its ends joined side by side to form a continuous perimeter boundary around the photographic positive or other planar art work to be reproduced.

With the flexible tube placed on the upper surface of the silk screen to form a continuous perimetral boundary around the photographic positive, the plate according to the present invention is placed flat on the upper surface of the tube. The plate is positioned so that the hole through the surface of the plate which communicates with the vacuum fitting on the upper surface of the plate lies within the interior of the boundary defined by the flexible tube.

Next, a vacuum source is connected to a vacuum fitting on the plate. This results in a reduction in pressure in the region encompassed by the flexible tube and lying between the upper surface of the silk screen and the lower surface of the plate. Atmospheric pressure on the lower surface of the emulsion-coated silk screen then forces the screen into intimate contact with the lower surface of the plate. As a result, the photographic positive lying on top of the silk screen is sandwiched tightly between the upper surface of the screen and the lower surface of the plate. The upper surface of the transparent plate is then exposed to a bright light source in a conventional manner. Stable registration of the image formed on the photo-sensitized emulsion on the surface of the silk screen is efficiently and reliably achieved by atmospheric pressure forcing the screen and photographic positive into intimate parallel contact with the lower surface of the transparent plate.

BRIEF DESCRIPTION OF THE DRAWINGS

FIG. 1 is an exploded, upper perspective view of the apparatus according to the present invention, along with a framed silk screen and a photographic positive typical of those that the apparatus is intended to be used with.

FIG. 3 is an enlarged, partially fragmentary front elevation view of part of the apparatus of FIG. 2.

FIG. 4 is a bottom plan view of the part of the apparatus shown in FIG. 3.

FIG. 6 is top plan view of the apparatus of FIG. 3 in use with a metal printing plate of larger surface area than that of the apparatus.

FIG. 7 is a front elevation view of the apparatus of FIG. 4.

DETAILED DESCRIPTION OF THE INVENTION

Figure 1:
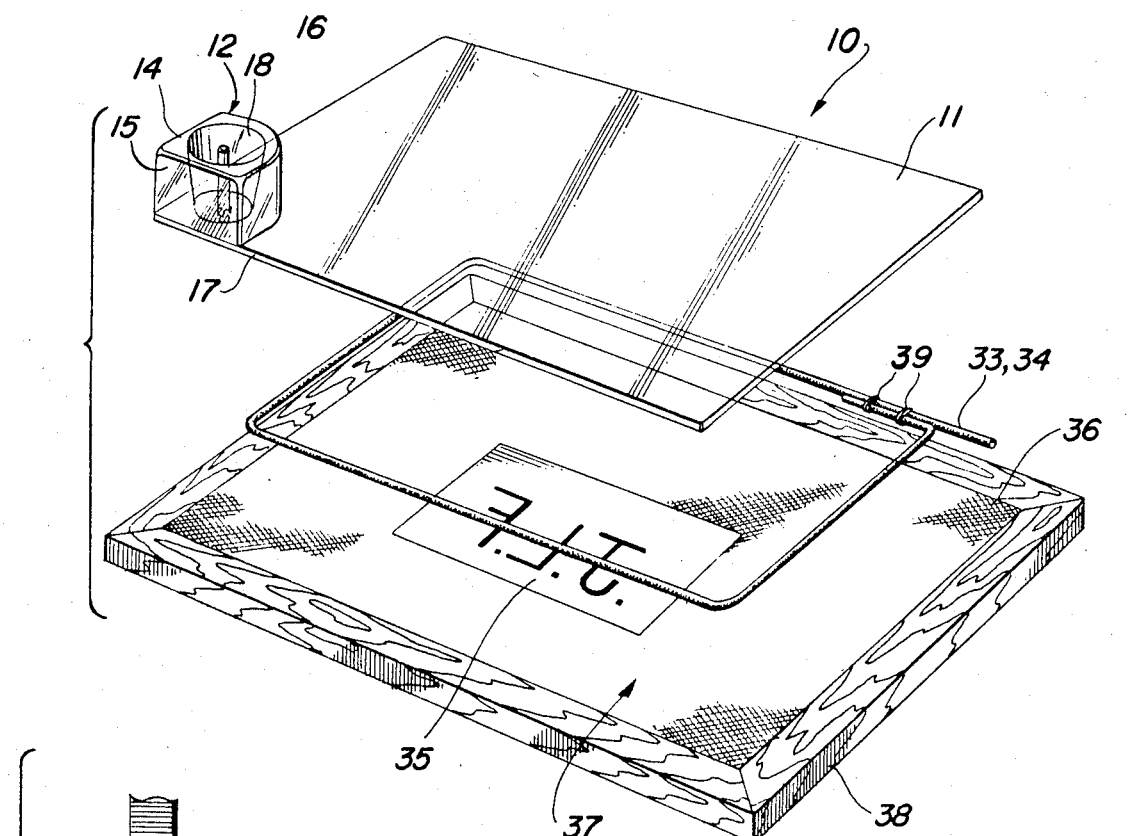

FIG. 1 shows the vacuum exposure registry apparatus 10 according to the present invention. Also shown in FIG. 1 are a framed silk screen and photographic positive exemplifying those which the apparatus is intended to hold together.

Referring now to FIG. 1, apparatus 10 includes a flat plate 11 made of a rigid transparent material such as clear acrylic or polycarbonate plastic. A generally block-shaped structure 12 is fastened to the upper surface 13. Block 12 is preferably fabricated from a rigid plastic.

As shown in FIG. 1, block-shaped structure 12 is disposed perpendicularly upwards from upper surface 13 of plate 11, and has a generally uniform outer cross-sectional shape. Block-shaped structure 12 has perpendicularly intersecting, vertically disposed left and front surfaces 14 and 15, respectively. Preferably, left and front block surfaces 14 and 15 are in respective co-planar alignment with left and front edges 16 and 17, respectively of plate 11.

Figure 2:
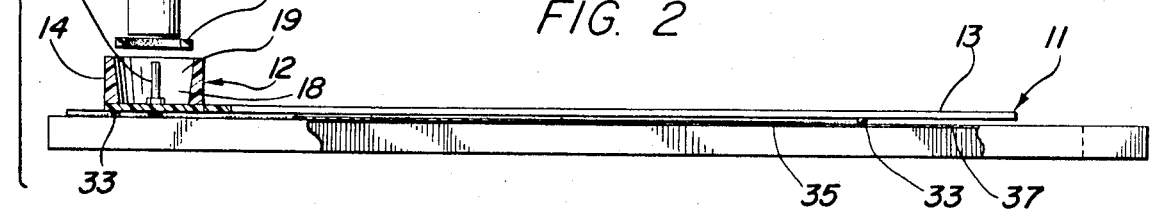
FIG. 2 is a partially fragmentary front elevation view of the apparatus of FIG. 1 in place on a silk screen.

As shown in FIGS. 1 and 2, block-shaped structure 12 contains a vertically disposed, circular transverse cross-section bore 18.

Bore 18 is tapered, having a relatively large entrance hole 19 through the upper transverse face 20 of block 12, and a smaller diameter exit hole 21 through the lower transverse face 22 of block 12.

As shown in FIGS. 1 and 2, the lower transverse face 22 of block 12 is disposed perpendicularly to left and front walls 14 and 15 of the block. Lower face 22 is fastened in parallel sealing contact with upper surface 13 of plate 11.

As may be seen best by referring to FIGS. 3 and 4, block 12 is fastened to plate 11 by screws 23 passing through clearance holes 24 through plate 11 into blind threaded holes 25 extending into block 12 through its lower transverse face 22. Of course, other methods could be used to fasten block 12 to plate 11, including the use of adhesives or solvent cements.

As shown in FIGS. 3 and 4, a cylindrical threaded hole 26 is bored through plate 11, perpendicular to upper surface 13 of the plate 11 and coaxial with bore 18 in block 12. A generally tubular metal hose fitting 27 having an enlarged hexagonal base flange 28 and an externally threaded tubular extension 29 extending downward from the bottom of the base flange is fastened to plate 11 by screwing threaded tubular extension 29 downward into threaded hole 26 through plate 11. The lower end of tubular extension 29 projects below the bottom surface 30 of plate 11 and contains several vertically disposed, radial rectangular slots 31 which pass through both the cylindrical side walls and bottom annular face of threaded tubular extension 29. The function of slots 31 will be described below.

As shown in FIGS. 1 and 2, that portion of tubular hose fitting 27 extending upward from hexagonal base flange 28 contains a longitudinal series of tapered annular steps 32. Steps 32 provide a secure connection with the inner diameter of a resilient vacuum hose which fitting 27 is intended to coupled to.

An essential component of the apparatus according to the present invention is a flexible hollow tube 33. Tube 33 is preferably fabricated from a elastomeric material such as soft polyvinyl plastic.

A flexible metal wire 34 is contained coaxially within tube 33. Although wires of various gauges and compositions will perform the intended function of wire loop 34 which is described below, I have found that rectangular cross-section staple wire having length and width cross-sectional dimensions of 0.028 inch and 0.034 inch is particularly well suited to use in the present invention. Preferably, if metal wire loop 34 is fabricated from rectangular cross-section wire, the longer cross-sectional dimension is oriented perpendicularly to the plane of the loop.

Apparatus 10 is used as follows. First, a negative original 35, typically a photographic transparency of an image to be reproduced, is placed on the upper surface 36 of a silk screen 37 which has been coated with a photo-sensitive emulsion, thereby filling the mesh openings in the silk screen and rendering it gas impermeable. Silk screen 37 is held tautly in frame 38.

Next, flexible tube 33 is formed into a curvilinear loop of the proper size and shape to circumscribe the perimeter of negative 35. This is accomplished by placing the ends of tube 33 in parallel overlapped juxtaposition to form a continuous loop of the desired circumference. The ends of tube 33 may be temporarily joined by any means permitting easy fastening and unfastening to adjust the circumference of the loop formed by joining the ends of the tube. I have found that rubber bands 39 of the type used to hold dental braces in place are particularly well suited to holding the end lengths of tube 33 in a desired position, merely by inserting both ends of the tube into axially spaced pairs of rubber bands 39, as shown in FIG. 1. After tube 33 has been formed into a loop of the correct size and shape to circumscribe negative 35, the malleability of wire 34 in tube 33 maintains tube 33 in the desired shape.

Referring now to FIG. 2, tube 32 is then placed on upper surface 36 of silk screen 37 in a position defining a closed perimetral boundary around transparency 35.

Next, plate 11 is placed flat down on silk screen 37, in approximate parallel alignment with silk screen frame 38. Plate 11 is positioned so that threaded tubular extension 29 of tubular hose fitting 27 lies within the interior of the boundary formed by tube 33.

A tube connected at one end to a vacuum source may then be connected to the upper end of tubular hose fitting 27. Alternatively, the cylindrical nozzle 40 of a standard vacuum cleaner may be inserted into entrance hole 19 of tapered bore 18 in block 12. Owing to the tapering of the walls of bore 18, cylindrical vacuum cleaner nozzle 40 forms a relatively air-tight seal with bore 18 merely by inserting the nozzle into the bore. If it is desired to make a more perfectly air-tight seal between nozzle 40 and bore 18, an elastomeric O-ring 41 may be placed over nozzle 40 before inserting the nozzle into entrance hole 19.

When the vacuum source coupled to block 12 is turned on air contained in the region lying between upper surface 36 of silk screen 37, below bottom surface 30 of plate 11, and within the perimeter of flexible tube 33, is drawn out from that region through the bottom opening and radial slots 31 of threaded tubular extension 29 extending below plate 11. Now, since both emulsion-coated silk screen 37 and flexible tube 33 are impermeable to air, the previously described region lying below plate 11 is sealed against air leaks. Accordingly, atmospheric pressure on the lower surface of emulsion-coated silk screen forces the screen upwards into the evacuated region. This upward force pushes upper surface 36 of silk screen 37 into intimate contact with transparency 35 and bottom surface 30 of plate 11. As a result, transparency 35 and silk screen 37 are held in stable registry, permitting photo-sensitive upper surface 36 of the silk screen to be exposed to a bright source through transparent plate 11, for as long a period as required.

Slots 31 in threaded tubular extension 29 of tubular hose fitting 27 ensure that air will be drawn from the region to be evacuated even if flexible silk screen 37 is drawn into sealing contact with the bottom opening of the threaded tubular extension.

Thus, the present apparatus provides a simple, efficient vacuum holding means for photographic exposure. Moreover, the apparatus is adaptable to varying sizes and shapes of photographic masters, and may use either a small diameter vacuum hose connected to a conventional vacuum pump, or a lower-cost vacuum cleaner which is more readily available.

Figure 5:
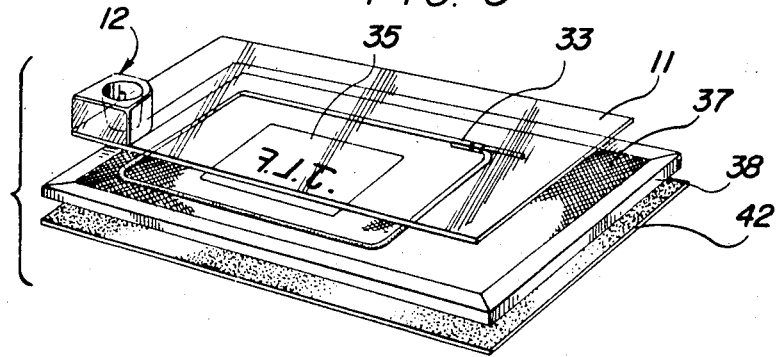
FIG. 5 is a front elevation view of a modification of the apparatus of FIG. 1 in use with a permeable screen.

A modification of the apparatus according to the present invention which may be used with a permeable screen is shown in FIG. 5. Among other applications, this modification is useful with silk screens which have been only partly coated with a photo-sensitive emulsion, leaving air leaks between uncoated fibers of the screen. It is also useful for making contact prints with color key proofing material.

As shown in FIG. 5, the modification of the apparatus according to the present invention consists of a flexible rectangular elastomeric sheet 42 which may be placed underneath the silk screen 37, thereby forming an air-tight seal when sheet 42 is drawn against the bottom surface of the silk screen.

FIGS. 6 and 7 show how the apparatus according to the present invention may be used to hold a photographic negative transparency in registry with a flexible, photo-sensitized metal printing plate, even including plates having a larger surface area than plate 11 of the apparatus.

Referring now to FIGS. 6 and 7, a thin, flexible photo-sensitized metal printing plate 43 having a desired exposure area encompassed by the perimeter of plate 11, but being larger than plate 11, is placed flat on flexible elastomeric sheet 42. A photographic positive 44 is then placed flat down on the photo-sensitized upper surface of plate 43 in a desired printing position. Flexible tube 33 is bent into a loop which encompasses positive 44, and is then placed down on plate 43 surrounding the negative. Plate 11 of the apparatus is then placed down on the upper surface of tube 33, as shown in FIGS. 6 and 7. The free end of hose 45 connected at its opposite end to a vacuum pump is pushed down over tubular hose fitting 27, and the vacuum pump is then turned on. The action of the vacuum pump reduces the pressure in the region lying between the upper surface of printing plate 43, below bottom surface 30 of plate 11, and within the perimeter of flexible tube 33. Owing to the flexibility of metal printing plate 43, the upper surface of the plate is drawn towards lower surface 30 of apparatus plate 11, sandwiching positive 44 between apparatus plate 11 and metal printing plate 43. As in the description of the basic embodiment, positive 44 and photo-sensitized metal printing plate 43 are held in stable registry, permitting the photo-sensitive surface of the plate to be exposed to a bright light source through transparent plate 11, for as long a period as required.

What is claimed is:

1. An apparatus for holding a thin, image-bearing sheet in intimate contact with a flat photo-sensitized surface for registering said image on said surface when both are exposed to light comprising:
    (a) A rigid, transparent plate, having a flat lower surface and a generally parallel upper surface,
    (b) an air conduit having an upper opening and a lower opening passing through said upper and lower surfaces of said plate, and
    (c) a flexible elastomeric tube adjustably joinable at opposite ends of said tube to form a closed loop of desired size and shape, whereby placing said loop around said image-bearing sheet lying on said photo-sensitized surface, and placing said plate down upon the upper surface of saio loop with said lower conduit opening within the perimeter of said loop forms an air-tight region lying within said perimeter boundary of said loop and between said lower surface of said plate and said upper surface of said photo-sensitized surface, thereby permitting said air-tight region to be evacuated by means of a vacuum source communicating with said upper conduit opening.

2. The apparatus of claim 1 wherein said plate has a generally rectangular plan view cross-sectional shape.

3. The apparatus of claim 1 wherein said air conduit comprises a tube extending perpendicularly upwards through a hole through said upper and lower surfaces of said plate.

4. The apparatus of claim 3 including means for sealably coupling a vacuum source fitting of larger diameter than said air conduit tube to the interior of said tube, said means comprising a block-shaped member having a flat lower transverse surface, a flat parallel upper transverse surface, and longitudinally disposed, tapered central bore having a relatively large entrance hole through said upper transverse surface and a smaller diameter exit hole through said lower transverse surface, said block-shaped member being fastened with said bore coaxially enclosing said air conduit tube and said flat lower transverse surface in sealing contact with said upper surface of said plate, whereby a tubular vacuum nozzle inserted into an interference fit with the inner walls of said bore may communicate with said conduit tube.

5. The apparatus of claim 3 wherein said air conduit tube includes an extension which projects downward below said bottom surface of said plate, said extension portion of said air conduit tube containing a plurality of axially disposed, radial slots which pass through both the side walls and bottom face of said extension.

6. The apparatus of claim 3 further comprising a thin, flat sheet of elastomeric material conformable to the bottom perimeter of said plate.

7. The apparatus of claim 3 wherein said air conduit tube is fastened to said plate near the perimeter of said plate.

8. A vacuum exposure registry apparatus comprising:
    (a) a flat, rigid, transparent plate having parallel upper and lower surfaces,
    (b) a generally block-shaped member having a flat lower transverse surface sealingly fastened to said upper surface or said plate, a generally flat upper transverse surface, and a longitudinally disposed, tapered bore having a relatively large entrance hole through said upper transverse surface, and a smaller diameter exit hole through said lower transverse surface,
    (c) an air conduit tube coaxial with said bore of said block-shaped member extending perpendicularly upwards through a hole through said upper and lower surfaces of said plate, and
    (d) a flexible elastomeric tube adjustably joinable at opposite ends of said tube to form a closed loop of desired size and shape.

9. The apparatus of claim 8 wherein said flexible elastomeric tube contains a malleable member effective in maintaining shapes which said tube may be bent into.

10. The apparatus of claim 9 wherein said malleable member comprises a length of flexible wire.

11. The apparatus of claim 8 wherein said air conduit tube includes an extension which projects downward below said bottom surface of said plate, said extension of said air conduit tube containing a plurality of axially disposed, radial slots which pass through both the side walls and bottom face of said extension.

12. The apparatus of claim 8 wherein said ends of said flexible elastomeric tube are joined by elastic bands encircling both ends of said tube.

13. The apparatus of claim 8 wherein the plan view cross-sectional shape of said plate is generally rectangular.

14. The apparatus of claim 13 wherein said block-shaped member is fastened to said upper surface of said plate near a corner of said plate.

* * * * *